US012332639B1

(12) United States Patent
Altvater et al.

(10) Patent No.: US 12,332,639 B1
(45) Date of Patent: Jun. 17, 2025

(54) STANDARDIZED MACHINE DATA INTERFACE PROTOCOL

(71) Applicant: Amazon Technologies, Inc., Seattle, WA (US)

(72) Inventors: Steven Scott Altvater, Elkton, MD (US); Tony James Millross, Tampa, FL (US); Kyle Robert Hoxit, Mays Landing, NJ (US); Jigar Pandya, Robbinsville, NJ (US); Marcos A. Sanchez, Lithia, FL (US)

(73) Assignee: Amazon Technologies, Inc., Seattle, WA (US)

( * ) Notice: Subject to any disclaimer, the term of this patent is extended or adjusted under 35 U.S.C. 154(b) by 655 days.

(21) Appl. No.: 17/729,265

(22) Filed: Apr. 26, 2022

(51) Int. Cl.
*G05B 19/048* (2006.01)
*G05B 19/418* (2006.01)
*G05B 23/02* (2006.01)

(52) U.S. Cl.
CPC ... *G05B 23/0227* (2013.01); *G05B 19/41835* (2013.01); *G05B 19/4185* (2013.01); *G05B 2219/24074* (2013.01); *G05B 2219/25205* (2013.01)

(58) Field of Classification Search
None
See application file for complete search history.

(56) References Cited

U.S. PATENT DOCUMENTS

| 5,598,572 | A | * | 1/1997 | Tanikoshi | G05B 19/042 712/30 |
| 2012/0166624 | A1 | * | 6/2012 | Suit | G06F 11/3409 709/224 |
| 2018/0349433 | A1 | * | 12/2018 | Baines | G06F 16/258 |
| 2019/0065214 | A1 | * | 2/2019 | Kane | G06F 11/3075 |
| 2020/0215735 | A1 | * | 7/2020 | Wang | G06F 8/34 |

* cited by examiner

*Primary Examiner* — Tuan S Nguyen
(74) *Attorney, Agent, or Firm* — Kilpatrick Townsend & Stockton LLP

(57) ABSTRACT

Embodiments for a standardized machine data interface protocol are described herein. A request for information about a state of a component of a machine may be received where the request is in an agnostic data format. A particular machine and a particular component of the particular machine may be determined based on the agnostic data format. A data structure of the agnostic data format for the particular machine and the particular component may be determined where the data structure is associated with the state. The state may be requested from the particular machine for the particular component using a format of the data structure. The state of the particular component may be received according to the format of the data structure. The state of the particular component may be converted from the format of the data structure to the agnostic data format of the request.

20 Claims, 8 Drawing Sheets

STANDARDIZED MACHINE DATA INTERFACE PROTOCOL

BACKGROUND

Conventional machine controller systems are configured to continuously monitor the state of various components and make decisions using custom or vendor-specific programming to control the state of the various components. As the machine controller systems provide continual operations, updating the programming logic or code of the system can be difficult as any interruption in the services provided by associated electromechanical devices could be dangerous or costly to a corresponding facility. Compounding the problem is the fact that each machine controller system may utilize a different vendor specific integrated development environment (IDE) necessitating different code or logic to solve the same problem across various machines. Attempting to communicate with the machine controller systems may require using different languages, different communication protocols, and each machine controller system may not maintain or obtain the same data as another machine controller system. Thus, loses in time and man power can result when attempting to navigate communicating with or obtaining data from machine controller systems of a facility without expertise knowledge of the various IDEs or communication protocols required by each machine controller system.

BRIEF DESCRIPTION OF THE DRAWINGS

Various embodiments in accordance with the present disclosure will be described with reference to the drawings, in which.

DETAILED DESCRIPTION

Figure 1:
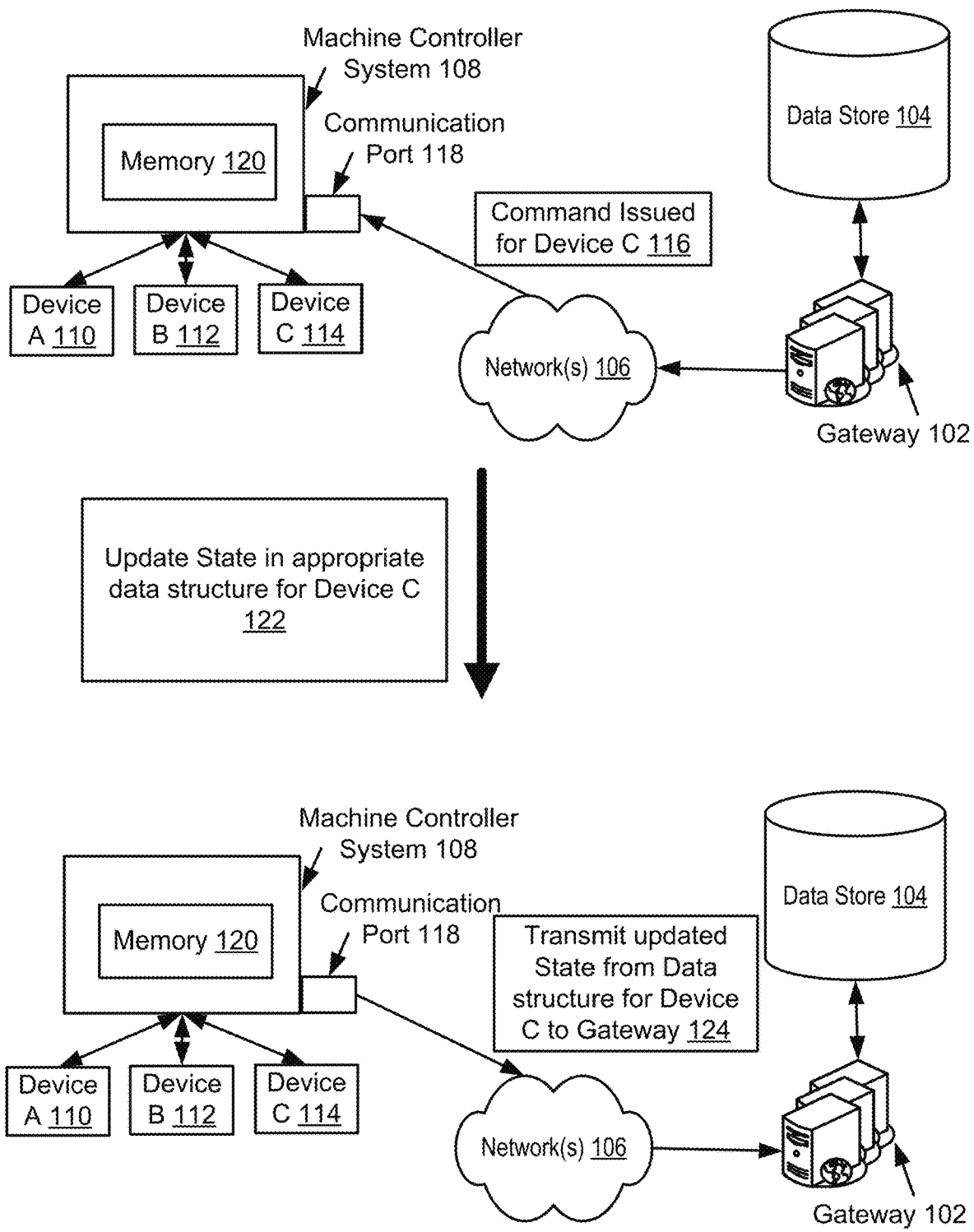
FIG. 1 illustrates an example workflow for a machine data interface feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for using a standardized machine data interface protocol to communicate with controller systems, machine handling equipment, machine controller systems (machines), such as a programmable logic controller (PLC), and components or electromechanical devices associated with the controller systems. More specifically, techniques described herein provide for using a data agnostic data format to request or obtain state information defined in a data structure for each component and/or controller system. By utilizing a proliferated data structure that identifies which data points each controller system and component(s) combination needs to maintain, a computer system can make requests in a data agnostic format without knowledge of the specific IDE, computer programming language, or communication protocol used by the controller system to communicate with the component(s). Instead, the computer system can make a request for state information (a state) of a data point as identified in the data structure for a component in the data agnostic format, and the specific machine which receives the request can interpret the request and use its own language, IDE, etc., to make a machine specific query to obtain the requested data and return the state or modify the state. The machine data interface features described herein include modifying the state information for a data point which can be interpreted by the machine to modify the functionality of an associated component. For example, a data structure may include a status-state current data point which can be modified, via instructions from a computer system, to change from active to wait or stop.

Conventionally, purchased controller systems or machine handling equipment may be programmed using specific, and sometimes proprietary, execution code to perform tasks and communicate with associated components. This can result in a same type of machine controller system and component combination, such as a PLC and a conveyor belt, speaking different languages (firmware, programming language, communication protocols) as well as maintaining different data points. For example, one vendor or manufacturer may offer a PLC and conveyor belt combination system which maintains a speed data point whereas another PLC and conveyor belt combination system offered by another vendor may not include a maintained speed data point. This can result in interruptions to functionality of the machines or associated facilities as it takes time to figure out which machines speaking which language and if requested data points can even be obtained from a machine or if re-programming of the machine is necessary. The machine data interface features described herein utilize a standardized data model (data structure) that specifies data points and basic commands which are to be obtained by each specific machine type regardless of vendor, language, or communication protocol. By utilizing such a standardized data interface feature computer systems may easily and efficiently access data points from a variety of machines of a facility as well as orchestrate machine control functionality at a large scale without the expert knowledge required by each machines unique setup.

In embodiments, each machine may use the data structure layer to receive commands or requests for information about associated components, such as the state of a particular component which may include operational status, speed, warnings, power draw, mode, etc. As the standard machine data interface is proliferated to various manufacturers, each producer of the machine may use their own proprietary language to obtain, maintain, and update the data points required by the data structure. Moreover, the computer system, a gateway computer for example, requesting information or providing commands doesn't require another data translation step by the machine to confirm a state change or provide information. Instead, the machine merely updates the state data point requested or commanded to update and the interacting computers system can interpret the state from the data structure. By using a standardized data protocol other advantages may be achieved as well. For example, service provider computers may generate graphical representations of the known state data points for various machines of a facility to present the state information via a user interface.

Moreover, user interfaces may be generated with simple commands using an agnostic data format associated with the data points of a data structure for a specific machine. For example, a user interface may present a stop command feature which, when interacted with via the user interface, may cause an update to the data structure for the specific machine. The specific machine can then interpret this change in state into its own machine specific query to carry out the command. Absent the solutions described herein, going from a stop command down to the specific machine query of a specific machine could require data conversion from multiple languages or interfaces as well as expert knowledge of the specific machine to determine whether such a command could be received and properly interpreted. In accordance with at least one embodiment, the service provider computers may maintain historical state information for the various machines and associated components and use the historical state information to train one or more machine learning algorithms. The machine learning algorithms may be trained to identify equipment failure thresholds which can be compared to current received state information to predict equipment failure before it happens. Such predications can be generated into notifications which are transmitted to user devices. In some embodiments, the service provider computers may generate and transmit instructions for updating a state of a machine that corresponds to its functionality to cause an associated component to wait or stop until repairs can be made based off the comparison of current state information for the component to a threshold generated by the machine learning algorithm.

FIG. 1 illustrates an example workflow for a machine data interface feature, in accordance with at least one embodiment. FIG. 1 depicts workflow 100 which includes a gateway computer (gateway) 102, a data store 104, network 106, and machine controller system 108. In embodiments, machine controller system 108 (controller system, machine) may be implemented as analog, digital, or mixed analog digital processing circuitry to direct the operation of an electromechanical system (component(s)). An example of machine controller system 108 may be programmable logic controller (PLC) or any suitable machine controller system that includes a real-time system which controls outputs that are required to be produced in response to control input conditions within a limited period of time or unintended operation of corresponding electromechanical devices or systems may occur. An electromechanical device (Device A 110, Device B 112, Device C 114) (components) may include sorting, packaging, and label application lines, manufacturing and tooling lines, robotic assembly lines, as well as other suitable automated systems.

The workflow 100 depicts a command issued for Device C 116, transmitted by the gateway 102, to the machine controller system 108 via communication port 118. In embodiments, the networks 106 and communication port 118 may enable communication between gateway 102 and machine controller system 108 using suitable network communication protocols such as transmission control protocol/internet protocol (TCP/IP) or internetwork package exchange/sequenced packet exchange (IPX/SPX). The workflow 100 depicts the machine controller system 108 including memory 120 which is configured to perform operations (input/output operations) for Devices A, B, and C (110-114). The memory 120 may contain executable instructions for operating the input and output operations for Devices A, B, and C (110-114) as well as IDE specific instructions for communicating commands or requests for state information from gateway 102 or other entities (not pictured). In embodiments, the memory 120 may be configured to maintain and update a data structure that is specific for a type of the machine controller system 108. The data structure may correspond to a standard machine data interface associated with the machine data interface features described herein.

In embodiments, the data structure maintained and updated in memory 120 of the machine controller system 108 may identify various data points for state information of Devices A, B, and C (110-114). In accordance with at least one embodiment, gateway 102 may maintain a mapping of agnostic data format commands or requests to data structure for Devices A, B, and C (110-114) and/or machine controller system 108. In some embodiments, the gateway 102 may maintain a mapping operation to match schemas or data models between devices of a controller system or perform/execute logical expressions to determine a state of controller systems or associated devices (10 and 110-114). As described herein, commands may be issued (116) to machine controller system 108 via networks 106 using a data agnostic format which can be interpreted by the gateway 102 into a format of a data structure for machine controller system 108. In cases where commands are issued (116) as illustrated in workflow 100 of FIG. 1, the machine controller system 108 and memory 120 may update a state of a data point for the associated data structure (122) that corresponds to the command 116. For example, the command provided by gateway 102 may correspond to change an active state of Device C 114 to a wait state.

In embodiments, the machine controller system 108 can interpret the change in state for the data point in the data structure for Device C 114 into a machine specific command or instructions which changes active state of Device C 114 to a wait state. Once the command 116 has caused the update to the state 122 the machine controller system 108 and memory 120 may provide a response back to the gateway 102 which identifies the updated state 124 of the data structure for Device C 114. In embodiments, the response 124 back to gateway 102 is in a data format of the data structure, not the machine specific command or query used by machine controller system 108 to actually instruct the change in state for Device C 114 which may be specific to the IDE utilized by the machine controller system 108. Instead, the response 124 is in the data format of the data structure for machine controller system 108 and/or device C 114. The gateway 102 may be configured to convert the response 124 to the data agnostic format of the received command (not pictured) which may have been transmitted by a user device and/or service provider computers (not pictured). In accordance with at least one embodiment, the changes in state as well as command or requests transmitted by gateway 102 may be stored in data store 104 as historical state information (historical state(s)). As described herein, the historical state information may be used to train machine learning algorithms to predict equipment failure by identifying patterns of states for devices or data points for devices which result in equipment failure.

Figure 2:
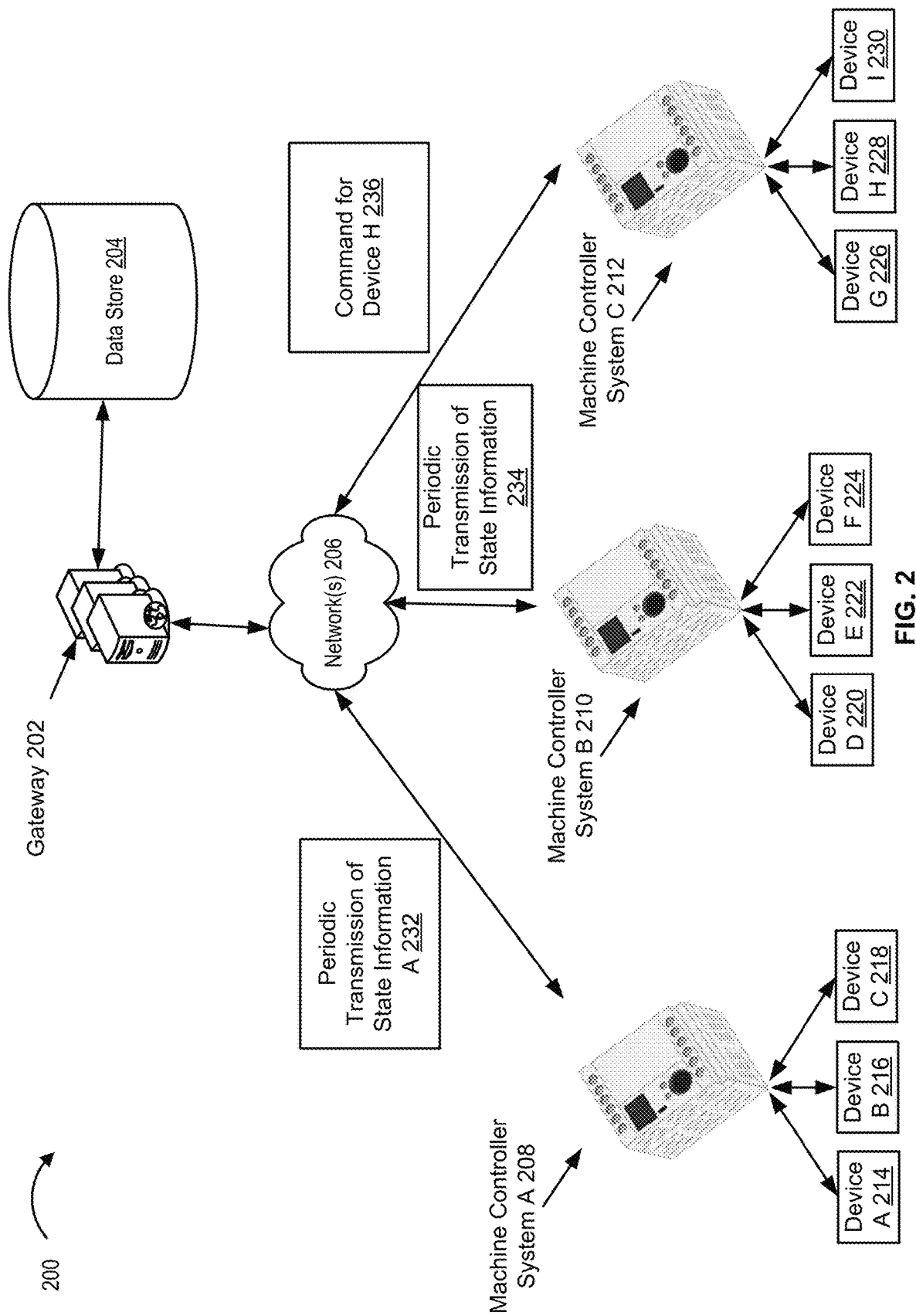
FIG. 2 illustrates an example workflow for a machine data interface feature, in accordance with at least one embodiment.

FIG. 2 illustrates an example workflow for a machine data interface feature, in accordance with at least one embodiment. The workflow 200 of FIG. 2 includes gateway 202, data store 204, networks 206, and machine controller systems 208-212. In embodiments, each machine controller system 208-212 may represent a machine controller system provided by a different vendor or manufacturer. Each machine controller system 208-210 may use a different vendor specific IDE for communicating with devices 214-230. Moreover, each device 214-230 may be a different type of device (component or electromechanical device). For example, machine controller system A 208 may include device A 214 which is a conveyor, device B 216 which is a robotic assembly tool, and device C 218 which is a label applicator. Conventionally, if commands or requests for information were provided to machine controller system A 208, the gateway 202 or other computer system would need to generate a unique request for each of the devices 214-218. Additionally, conventional machine handling equipment systems each utilize vendor specific identifiers for not only the controller systems (such as machine controller systems 208-212) but each device (such as devices 214-218). Each vendor specific identifier may use a different data format even among similar machines depending on an engineer who programmed the device or machine.

The machine data interface features described herein provide solutions to such identification and communication issues. For example, the standardized data interface protocol may include using an array data structure within the overall data structure for a machine and/or device which can be used to identify the appropriate component for a machine. For example, in the case of a conveyor machine the data structure may include data type: Conveyor [Total Num of conveyors+10% (Total Num of conveyors)]. The standardized protocol may require that each conveyor equipment module instance is assigned to a unique array element. As such, the gateway 202 can easily identify device A 214 via the unique array element assigned to it via the maintained data structure for machine controller system A 208 or mapped in data store 204 and accessed by gateway 202. The machine data interface features may also include data structure specific identifier requirements for machine controller systems 208-212.

In accordance with at least one embodiment, requests for state information may include an identifier in a data agnostic format (e.g., "Device A 214) which can be converted by the gateway 202 into a unique identifier such as Conveyor [0] which can be properly interpreted by machine controller system A 208. As facilities may include hundreds of machines controlling thousands of electromechanical devices, using vendor provided names, identifiers, or tags can result in non-optimized communication between a computer and the maintained machines and devices. By utilizing a standardized machine data interface protocol which defines how the machines are to be named despite vendor provided identifiers, a computer system may more easily identify and communicate with said machines and devices. Returning to FIG. 2, the workflow 200 depicts gateway 202 periodically requesting state information 232 and 234 from machine controller system A 208 and machine controller system B 210. The polled or periodically obtained state information may be stored in data store 204 and used to generate or update data representations, including graphic data representations, of the state information for machine controller system A 208 and machine controller system B 210 by gateway 202.

In embodiments, when requests for state information are received by the gateway 202 from other computer systems, such as a user device or service provider computers (not pictured), the gateway 202 may retrieve the most recently obtained information and convert it into the appropriate data agnostic format for resolving the request. In some embodiments, the receipt of a request by gateway 202 can cause the gateway 202 to request an updated state information from a given device and/or controller system. Workflow 200 also depicts gateway 202 transmitting a command 236 for Device H 228 of machine controller system C 212. As described herein, the command 236 may be converted from an agnostic data format to a format of a data structure for Device H 228. The state information for a corresponding data point of the data structure of Device H 228 may be updated in response to the command 236 and the update to the data structure may be reported back to gateway 202 for confirmation of execution of the command as well as storage within data store 204.

Figure 3:
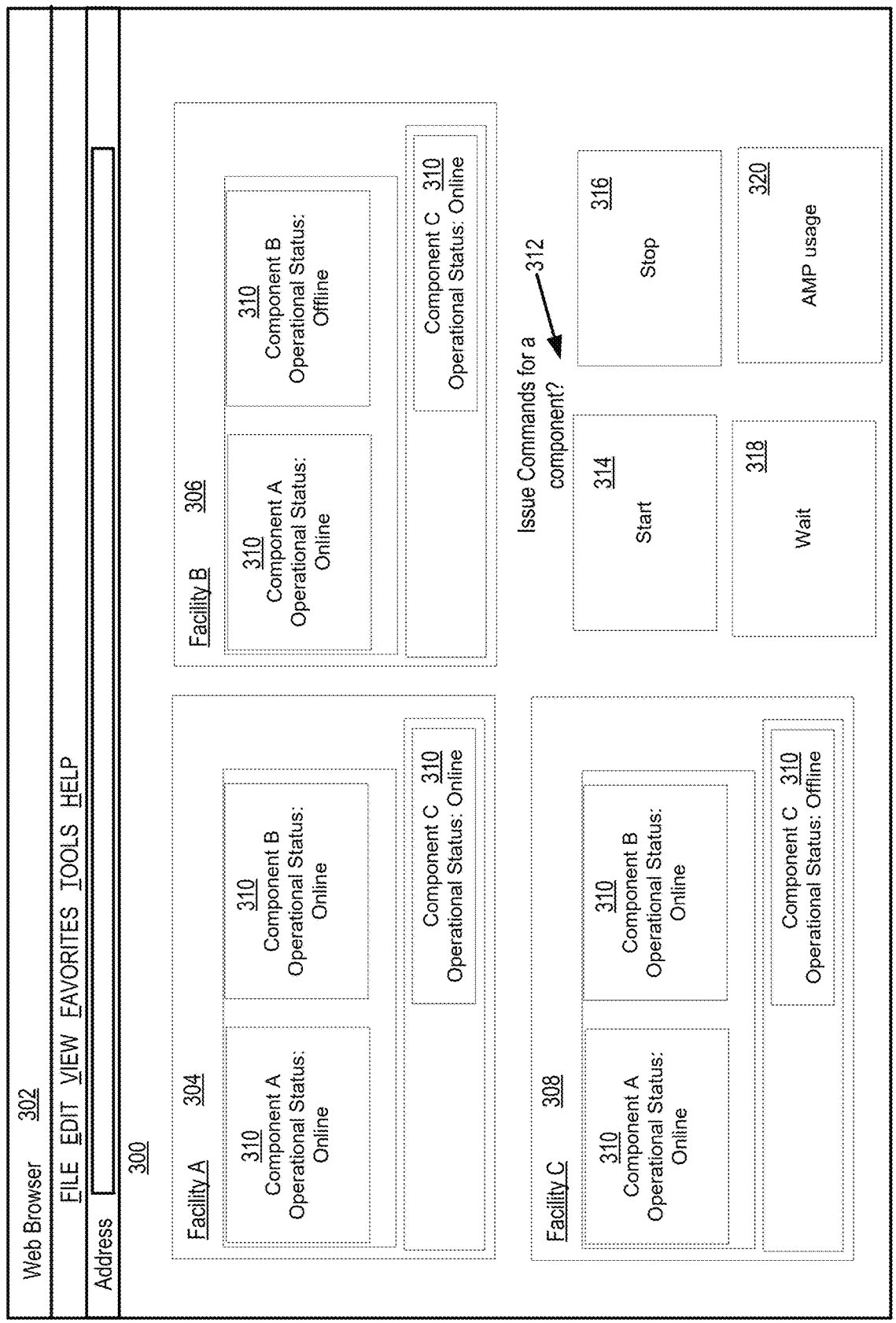
FIG. 3 illustrates an example graphical user interface for presenting states for components of machines of a facility as well as providing commands to update the states for said components for a machine data interface feature, in accordance with at least one embodiment.

FIG. 3 illustrates an example graphical user interface for presenting states for components of machines of a facility as well as providing commands to update the states for said components for a machine data interface feature, in accordance with at least one embodiment. FIG. 3 depicts user interface 300 presented via a web browser 302 for presenting graphical representations of state information for various components of various facilities in accordance with at least one embodiment. It should be appreciated that although user interface 300 is presented via a web browser 302 embodiments disclosed herein are not limited to such environments. For example, the user interface 300 may be presented and interacted with via an application of a computer system. As described herein, the machine data interface features are configured to generate a user interface for requesting state information as well as transmitting commands to interact with components associated with machines of a facility.

For example, user interface 300 presents graphical elements 304, 306, and 308—are each associated with a different facility. The graphical elements 304, 306, and 308 may present state information 310 which corresponds to data points of a data structure for various components included or otherwise associated with each facility. As described herein, a gateway computer or other computer system may periodically or continuously poll or request state information for components associated with controller systems. The received data may be converted to a data agnostic format which may be used to generate graphical elements 304-308 as well as state information 310 for components in communication with the gateway computer or service provider computers. The user interface 300 also depicts a notification 312 for issuing commands as well as several commands 314-320 which could be issued to components 310. For example, the commands 314-318 may represent commands which cause an update to the functionality of a given component 310 by updating the state of a data point for a data structure of given component 310 as described herein (e.g., via networks and a gateway computer). Command 320 corresponds to a request for a specific data point of a component such as 310. Various commands may be generated and presented via user interface 300 based on the known data points of the data structures associated with the components currently in communication with the computer system. For example, a command would not be generated and issued which was not supported by the data structure for a particular component of a facility.

Figure 4:
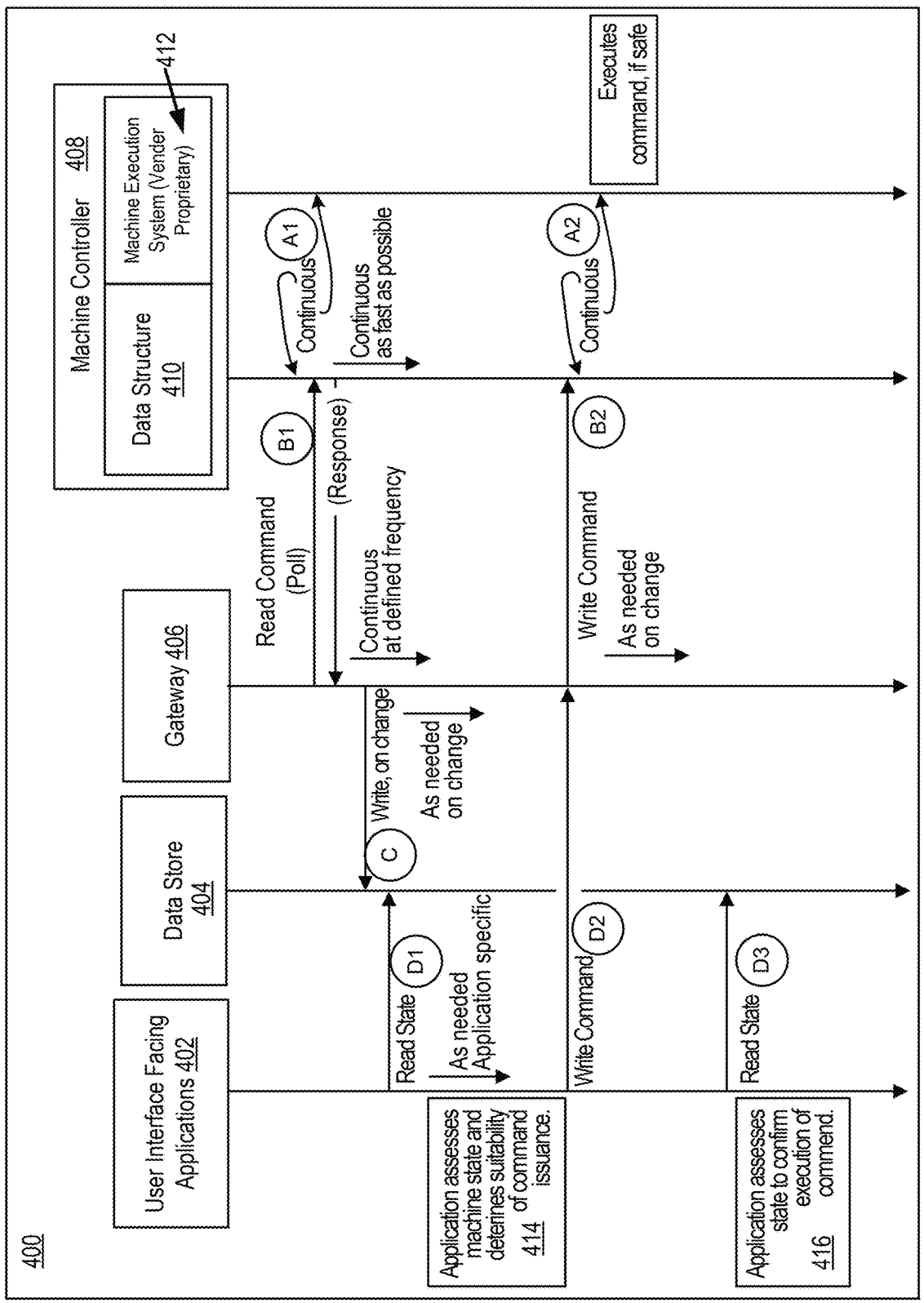
FIG. 4 illustrates an example swim lane diagram that shows the interaction and communication in an architecture for a machine data interface feature for the purposes of data acquisition and supervisory control, in accordance with at least one embodiment.

FIG. 4 illustrates an example swim lane diagram 400 that shows the interaction and communication in an architecture for a machine data interface feature for the purposes of data acquisition and supervisory control, in accordance with at least one embodiment. Swim lane diagram 400 includes user interface facing applications 402 (user interface 402), data store 404, gateway 406, and machine controller 408 which includes data structure 410 and machine execution system 412 in communication for implementing the machine data interface features described herein. The swim lane diagram 400 also includes a number of operations for communicating between devices 402-412 denoted as A1, A2, B1, B2, C, and D1-D3 as well as operations 414 and 416. Although FIG. 4 depicts a number of operations with a certain sequence it should be noted that the machine data interface features described herein may utilize sequences which occur perpetually and simultaneously with each communication sequence occurring at their own frequency (A, B, C, and D). The sequences of communications may occur independent of one-another.

As depicted in FIG. 4, operation A1 represents a continuous full-duplex read/write sequence between the machine execution system 412 of the machine controller 408 and the data structure 410. In embodiments, the machine execution system 412 and the data structure 410 are located in the same machine controller 408. In embodiments, the machine execution system 412 writes machine states for associated components and other data points to the data structure 410 as defined by the data structure of 410. Operation B1 represents a periodic full-duplex read/write sequence between the data structure 410 of the machine controller 408 and gateway 406. As discussed herein, the machine controller 408 and gateway 406 are physically separate and communication between the two occurs via an available network (not pictured). In embodiments, gateway 406 maintains a configuration that defines which machine controllers to connection to, which machine controller data points to request (poll), and how frequently. In some embodiments, the polling between the gateway 406 and machine controller 408 and data structure 410 occurs at one-second intervals. In cases where a polling event is scheduled (request), the gateway 406 initiates a request for data points (poll) from the data structure 410 within machine controller 408. The machine controller 408 responds to the request with current values of the requested data points. This operation may occur perpetually and initiates whenever a polling event is scheduled.

Operation C represents the gateway 406 comparing the values of the data-point values received from the machine controller 408 during the poll/response sequence to the data-point values received on previous poll/response sequences. Data points that have changed in value are written in data store 404. Data points that have not changed in value are ignored. This sequence occurs perpetually and initiates whenever there is a data-point that has changed in value.

Operation D1 represents an application of a user interface (e.g., application for generating, maintaining, and updating the user interface) reading the state of specific machines from data store 404. In some embodiments, the state of the specific machines may be read from data store 404 on an as-needed basis or in response to a request from a user interacting with the application and/or user interface-such as via a user device (not pictured). In accordance with at least one embodiment, the specific data and the read frequency from data store 404 are application specific and multiple applications may read from the data store 404 simultaneously.

Operation D2 represents that certain applications or users may be granted permission to write commands (requests) to machines to allow for remote machine control or advanced machine orchestration. The functionality to enable commands to be communicated between applications 402 and machine controller 408 may be defined in the data structure 410 for a type of machine controller 408 or type of components or machines associated with the machine controller 408. In embodiments, to issue a command, the applications 402 may write the commanded value to the correct memory location in gateway 406. In embodiments, the applications 402 may assess the machine state and determine suitability of the command issued at 414 in D2 prior to transmitting the command to gateway 406. For example, the applications 402 or gateway 406 may maintain and implement a number of rules or policies for issuing commands to machine controller 408 via gateway 406. For example, the state of a machine may be analyzed prior to a command being written or issued to gateway 406. In some cases a machine may be in a stop state in which case providing commands to said machine would be inappropriate. Or if a machine was in a certain mode, such as a maintenance mode, commands would be prevented from being issued to the gateway 406 as the machine is outside of its normal operational mode. Moreover, the rules and policies analyze commands based on the type of machine intended for the command. For example, if a command is directed to start a robotic arm associated with machine controller 408 but machine controller 408 is only associated with conveyors, such a command would fail to be issued or transmitted to gateway 406 based on the rules or policies. The rules or policies implemented by the systems depicted in FIG. 4 also utilize time constraints to prevent conflicting commands to interfere with each other (e.g., sending start and stop commands within 1 second of each other) or to allow for state updates to occur from the machine controller 408 to gateway 406 and data store 404 based on lag time in a network.

Operation B2 represents and is dependent on operation B1. For example, when a command is received from applications 402, the gateway 406 writes the command to the correct element of the data structure 410 of machine controller 408. This sequence also occurs on an as-needed basis. Operation A2 represents and is dependent on operation A1. The machine execution system 412 reads the machine commands from data structure 410 and executes the command as defined in the data structure 410 and its own machine specific language or environment. In some embodiments, the machine controller 408 is responsible for its own safety and may ignore commands that may introduce a risk to property or safety.

Operation D3 represents applications 402 using a sequence defined in D1 to confirm whether a command issued in D2 has been executed by the machine execution system 412 (e.g., read the state of the specific machines from data store 404). This results in the applications 402 confirming execution 416 of the command which may cause an update to a user interface associated with applications 402.

Figure 5:
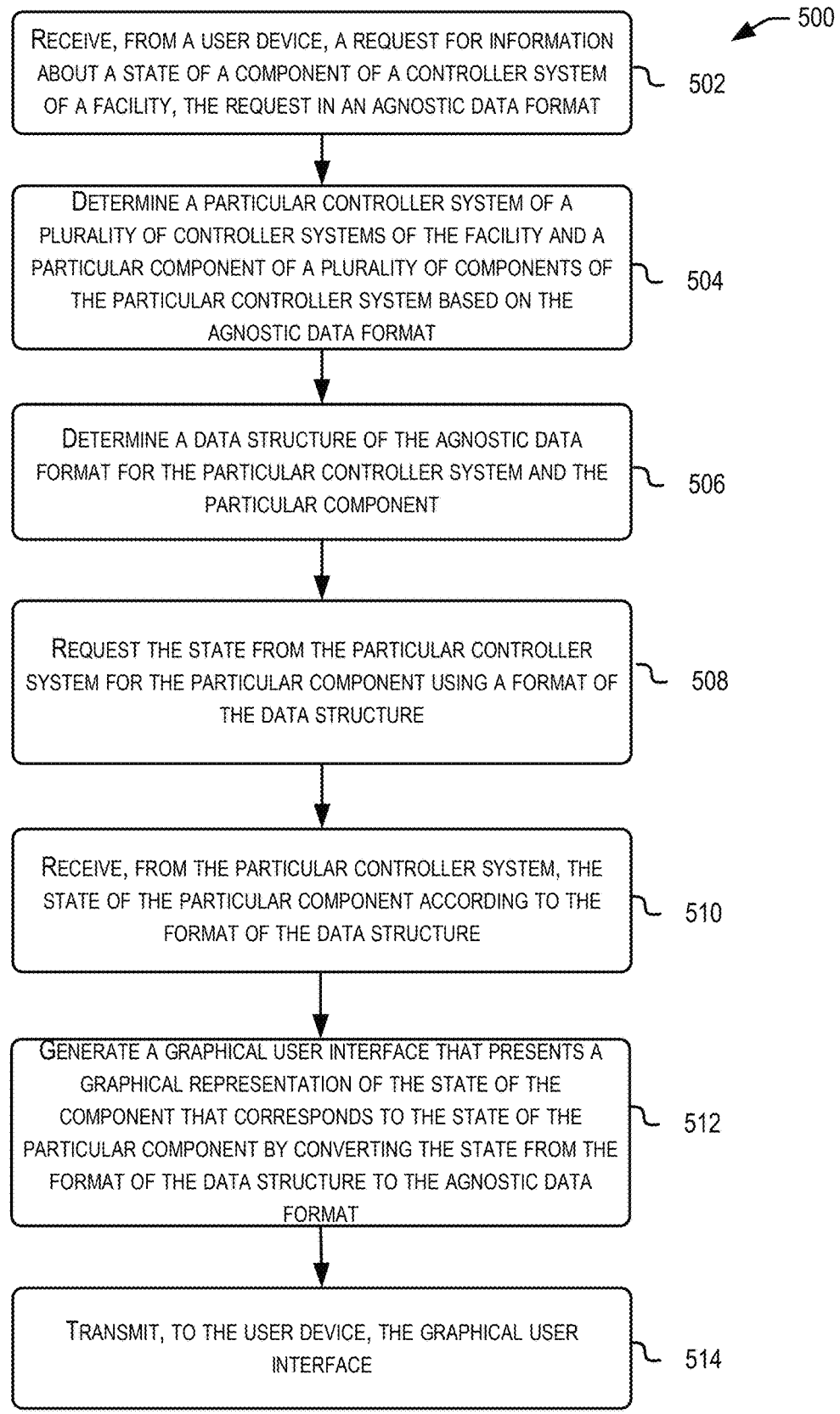
FIG. 5 illustrates an example flow chart for a machine data interface feature, in accordance with at least one embodiment.
Figure 6:
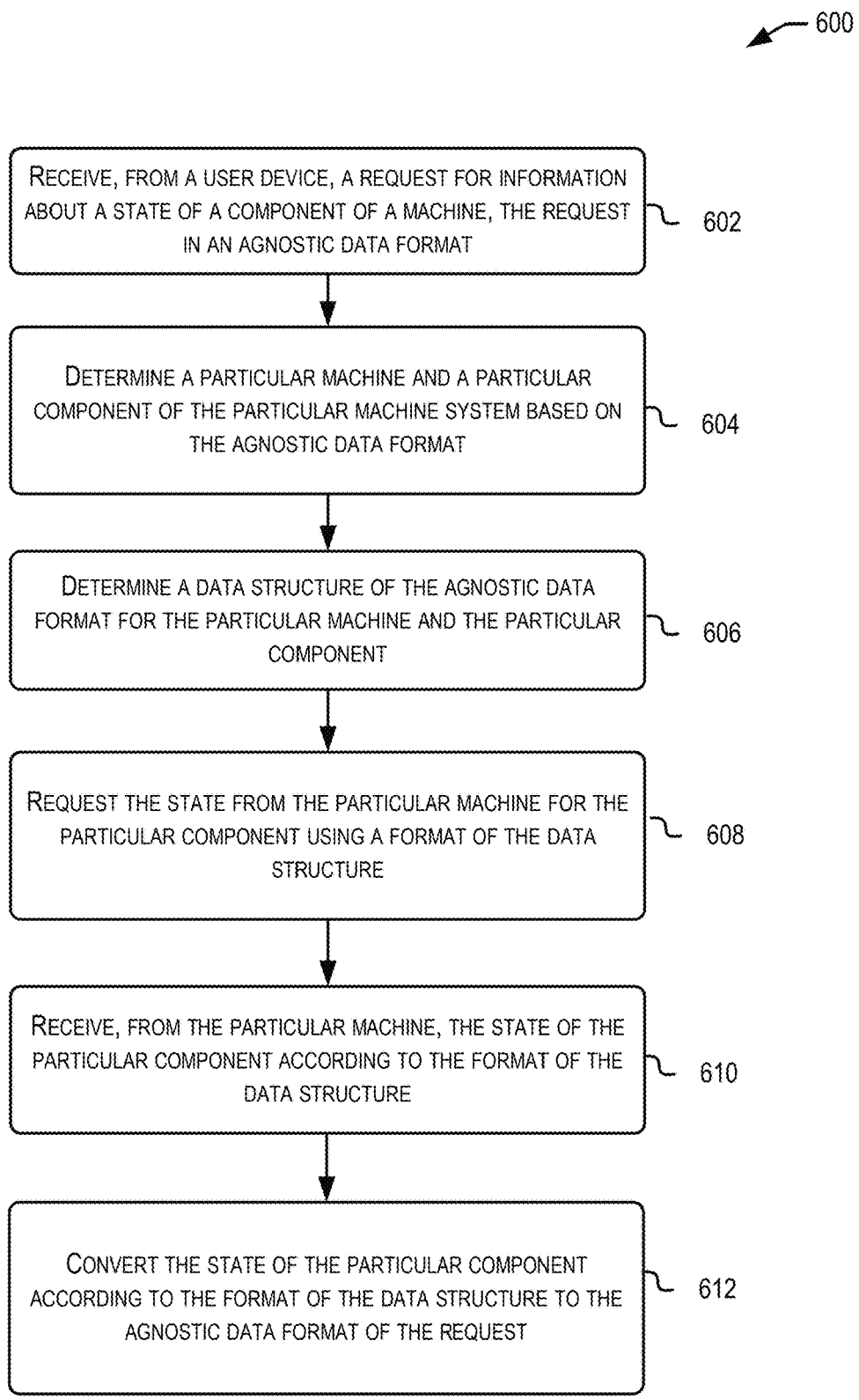
FIG. 6 illustrates an example flow chart for a machine data interface feature, in accordance with at least one embodiment.

FIGS. 5 and 6 illustrate example flow charts for machine data interface features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 7:
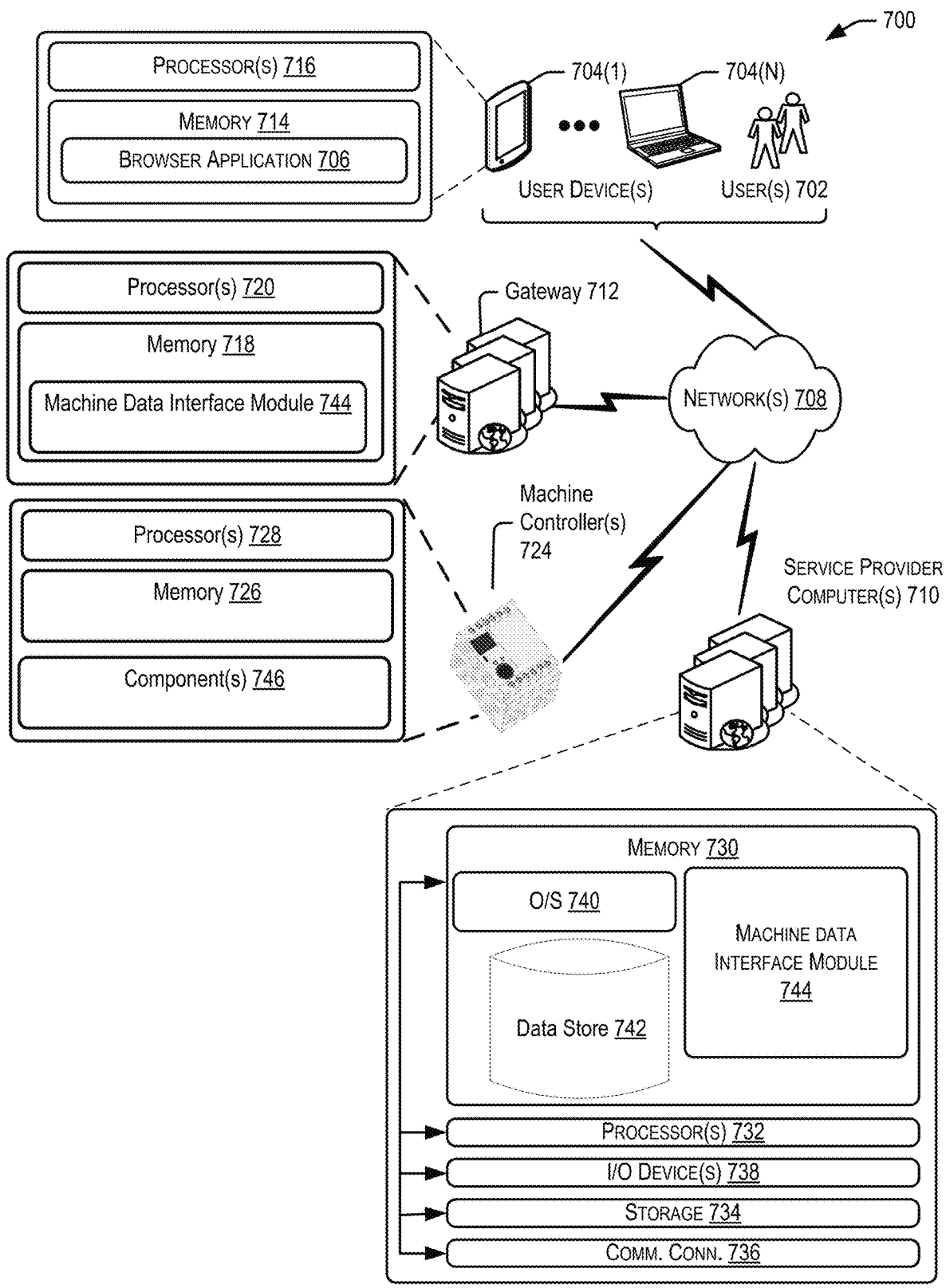
FIG. 7 illustrates an example architecture for implementing a machine data interface feature that includes machine controller systems, a gateway computer, a network, a server computer, and a user device, in accordance with at least one embodiment.

In some examples, service provider computers, gateway, machine controller(s) (service provider computers 710, gateway 712, machine controller(s) 724) utilizing at least the machine data interface module 744 depicted in FIG. 7 may perform the processes 500 and 600 of FIGS. 5 and 6. In FIG. 5, the process 500 may include receiving, from a user device, a request for information about a state of a component of a controller system of a facility, the request in an agnostic data format at 502. In embodiments, the request includes identifiers for the component and the controller system. The process 500 may include determining a particular controller system of a plurality of controller systems of the facility and a particular component of a plurality of components of the particular controller system based at least in part on the agnostic data format at 504. In embodiments, the particular controller system and the particular component each have or are associated with unique identifiers that are different than the identifiers included in the request.

The process 500 may include determining a data structure of the agnostic data format for the particular controller system and the particular component at 506. In embodiments, the data structure is associated with the state for the particular component. The process 500 may include requesting the state from the particular controller system for the particular component using a format of the data structure at 508. In accordance with at least one embodiment, the particular controller system is configured to translate the request of the state to a machine specific query associated with an integrated development environment (IDE) for the particular component according to the data structure. For example, a given controller system may utilize a proprietary IDE to communicate with components that are associated with the controller system. Using the data structure maintained by the controller system, the controller system can obtain the requested data point (e.g., state of a particular component of the controller system) using its proprietary language or within its own IDE and update the state of the data structure for the component based on the results of the request. The computer system interacting with the controller system need not know the specifics of the IDE utilized by the controller system. Instead, the computer system merely needs to be able to query the state from the data structure maintained by the controller system for the requested information.

The process 500 may include receiving, from the particular controller system, the state of the particular component according to the format of the data structure at 510. For example, if the state requested by the user device corresponds to a speed data point, the data structure may define that the speed is of an integer variable. The state received by the computer system would be some integer that represents the speed of the component. The process 500 may include generating a graphical user interface that presents a graphical representation of the state of the component that corresponds to the state of the particular component by converting the state from the format of the data structure to the agnostic data format at 512. To continue the above example, the integer variable may be converted to a different variable such as a float variable that is more easily interacted with by computer systems. The process 500 may include transmitting, to the user device, the graphical user interface at 514. In accordance with at least one embodiment, the computer system may determine the particular component from a plurality of components associated with a controller system by accessing an array data structure maintained by the controller system where each element of the array data structure is associated with a unique component. The computer system may identify a particular controller system from a plurality of controller systems of a facility based on a header of the data structure associated with each controller system. For example, one header may include "Conveyor Belt" while another header may include "Turnstile." As described herein, the machine data interface feature is associated with a pre-defined protocol integrated by the controller systems. In embodiments, the protocol may specify particular communication protocols to utilize when communicating state information for particular types of controller systems and/or components. For example, a given communication protocol may specify that requests from and responses to the computer system are encrypted to maintain security.

The process 600 may include receiving, from a user device, a request for information about a state of a component of a machine, the request in an agnostic data format at 602. In embodiments, the request includes identifiers for the component and the machine. The process 600 may include determining a particular machine and a particular component of the particular machine based at least in part on the agnostic data format at 604. In embodiments, the particular machine and the particular component each have or are associated with unique identifiers that are different than the identifiers included in the request.

The process 600 may include determining a data structure of the agnostic data format for the particular machine and the particular component at 606. In embodiments, the data structure is associated with the state for the particular component. The process 600 may include requesting the state from the particular machine for the particular component using a format of the data structure at 608. In accordance with at least one embodiment, the particular machine is configured to translate the request of the state to a machine specific query associated with an integrated development environment (IDE) for the particular component according to the data structure. For example, a given machine may utilize a proprietary IDE to communicate with components that are associated with the machine. Using the data structure maintained by the machine, the machine can obtain the requested data point (e.g., state of a particular component of the machine) using its proprietary language or within its own IDE and update the state of the data structure for the component based on the results of the request. The computer system interacting with the machine need not know the specifics of the IDE utilized by the machine. Instead, the computer system merely needs to be able to query the state from the data structure maintained by the machine for the requested information.

The process 600 may include receiving, from the particular machine, the state of the particular component according to the format of the data structure at 610. The process 600 may include converting the state for the particular component according to the format of the data structure to the agnostic data format of the request at 612. In embodiments, the computer system may generate a graphical representation of the state and transmit the graphical representation to the user device for presentation via an associated user interface. In accordance with at least one embodiment, the machine learning algorithms that are trained by the computer system using historical state data or information may be used to predict failures of equipment, generate notifications identifying which pieces of equipment are likely to fail, and even generate and transmit instructions to stop the equipment prior to failure (e.g., transmit updates to state information of a data structure for a component which when read by the machine cause the component to stop working). In embodiments, the computer system may maintain a mapping between the agnostic data format and data structures for a plurality of machines and associated components. This mapping may be updated dynamically as new machines or components are added or further changes are made to the already existing data structures.

FIG. 7 illustrates an example architecture for implementing a machine data interface feature that includes machine controller systems, a gateway computer, a network, a server computer, and a user device, in accordance with at least one embodiment. In architecture 700, one or more users 702 (e.g., administrators, users, entities, etc.) may utilize user computing devices 704(1)-(N) (collectively, user devices 704) to request information (a state) about machine controllers 724, components 746 of the machine controllers 724, or a facility in general from service provider computers 710 and gateway 712 via networks 708. Users 702 may interact with user device 704 and utilize browser application 706 (access a browser application 706 or a user interface (UI) accessible through the browser application 706) to request information (a state) from gateway 712 and service provider computers 710 as well as receive notifications or messages generated by service provider computers 710 regarding the requested information, the machine controllers 724, or components 746. The "browser application" 706 can be any browser control or native application that can access and display a network page or other information such as a user interface of a native software application for requesting information about machines and components of the machines in a facility, about the facility, as well as receiving information from the service provider computers 710. A native software application may include an application or program that has been developed for use on a particular platform (such as an operating system) or a particular device (such as a particular type of mobile device or user device 704). In embodiments, the user device 704 may include one or more components for enabling the user 702 to interact with the browser application 706 and provide input regarding received notifications or messages transmitted by the service provider computers 710 or to provide commands to the machine controllers 724 and/or components 746 via gateway 712 and network 708.

The user devices 704 may include at least one memory 714 and one or more processing units or processor(s) 716. The memory 714 may store program instructions that are loadable and executable on the processor(s) 716, as well as data generated during the execution of these programs. Depending on the configuration and type of the user devices 704, the memory 714 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 704. In some implementations, the memory 714 may include multiple different types of memory, such as static random access memory (SRAM), dynamic random access memory (DRAM), or ROM.

Turning to the contents of the memory 714 in more detail, the memory 714 may include an operating system and one or more application programs or services for implementing the features disclosed herein. Additionally, the memory 714 may include one or more modules for implementing the features described herein including the machine data interface module 744.

The architecture 700 may also include one or more service provider computers 710 that may, in some examples, provide computing resources such as, but not limited to, client entities, low latency data storage, durable data store, data access, management, virtualization, hosted computing environment or "cloud-based" solutions, electronic content performance management, etc. The service provider computers 710 may implement or be an example of the service provider computer(s) described herein with reference to FIGS. 1-6 and throughout the disclosure. The one or more service provider computers 710 may also be operable to provide site hosting, computer application development, and/or implementation platforms, combinations of the foregoing, or the like to the one or more users 702 via user devices 704.

In some examples, the networks 708 may include any one or a combination of many different types of networks, such as cable networks, the Internet, wireless networks, cellular networks, and other private and/or public networks. While the illustrated examples represents the users 702 communicating with the service provider computers 710 and gateway 712 over the networks 708 via user devices 704, the described techniques may equally apply in instances where the users 702 interact with the one or more service provider computers 710 and gateway 712 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 710 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 710 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 710 may be in communication with the user device 704 via the networks 708, or via other network connections. The one or more service provider computers 710 may include one or more servers, perhaps arranged in a cluster or as individual servers not associated with one another.

The architecture 700 may include gateway 712 and machine controllers 724 that are in communication with the service provider computers 710 and/or the user devices 704 via networks 708. In embodiments, the gateway 712 may include memory 718, processor(s) 720, and machine data interface module 744. The memory 718 may store program instructions that are loadable and executable on the processor(s) 720, as well as data generated during the execution of these programs and/or program instructions. In accordance with at least one embodiment, the gateway 712 may be configured to receive and translate or convert requests for information (states) of machine controllers 724 or associated components 746 from user device 604. As discussed below, the machine data interface module 744 may be configured to request or otherwise obtain state information from machine controllers 724 for components 746, convert the state information from a data structure format to an agnostic data format, maintain a mapping of agnostic data formats to the data structure formats for machine controllers 724 and components 746, as well as transmit the converted state information to user device 704 and/or service provider computers 710. The gateway 712 and machine data interface module 744 may be configured to generate graphical representations of the state information for components 746 which are then transmitted to service provider computers 710 and/or user device 704 via networks 708.

The architecture 700 may include machine controllers 724 which may include memory 726 and processors 728. The memory 726 may store program instructions that are loadable and executable on the processor(s) 728, as well as data generated during the execution of these programs and/or program instructions. In embodiments, the machine controllers 724 may be associated with a number of components 746. The machine controllers 724 may include a field bus (not pictured) that further includes multiple analog and/or digital input and output (I/O) ports or connections (not pictured) for interfacing with components 746 as well as memory 726 and processors 728. Examples of components 746 may include conveyors, drive motors, electromechanical actuators (e.g., solenoids, switches, relays, robotic actuators, linear actuators, etc.), cameras and vision systems, scanners, sensors, timers, scales, label applicators, measurement devices (e.g., temperature sensors, humidity sensors, etc.), and other devices. The machine controllers 724 may implement, update, and maintain a data structure for each type of associated component 746 for obtaining state information (a state) of the data structure and transmitting the state to gateway 712 via networks 708.

In one illustrative configuration, the one or more service provider computers 710 may include at least one memory 730 and one or more processing units or processor(s) 732. The processor(s) 732 may be implemented as appropriate in hardware, computer-executable instructions, firmware, or combination thereof. Computer-executable instruction or firmware implementations of the processor(s) 732 may include computer-executable or machine-executable instructions written in any suitable programming language to perform the various functions described when executed by a hardware computing device, such as a processor. The memory 730 may store program instructions that are loadable and executable on the processor(s) 732, as well as data generated during the execution of these programs. Depending on the configuration and type of the one or more service provider computers 710, the memory 730 may be volatile (such as RAM) and/or non-volatile (such as ROM, flash memory, etc.). The one or more service provider computers 710 or servers may also include additional storage 734, which may include removable storage and/or non-removable storage. The additional storage 734 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 730 may include multiple different types of memory, such as SRAM, DRAM, or ROM.

The memory 730, the additional storage 734, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 730 and the additional storage 734 are all examples of non-transitory computer storage media. Additional types of non-transitory computer storage media that may be present in the one or more service provider computers 710 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 710. Combinations of any of the above should also be included within the scope of non-transitory computer-readable media.

The one or more service provider computers 710 may also contain communication connection interface(s) 736 that allow the one or more service provider computers 710 to communicate with a data store, another computing device or server, user terminals, and/or other devices on the networks 708. The one or more service provider computers 710 may also include I/O device(s) 738, such as a keyboard, a mouse, a pen, a voice input device, a touch input device, a display, speakers, a printer, etc.

Turning to the contents of the memory 730 in more detail, the memory 730 may include an operating system 740, one or more data stores 742, and/or one or more application programs or services for implementing the features disclosed herein including the machine data interface module 744. In accordance with at least one embodiment, the machine data interface module 744 and service provider computers 710 may be configured to receive or otherwise obtain, via periodic polling or requests, state information for components 746 from controllers 724 via networks 708. The obtaining or requesting of the state information may be in response to a request provided by user device 704 via networks 708. The service provider computers 710 and machine data interface module 744 may be configured to maintain historical state information obtained from machine controllers 724 and components 746 for training and implementing a machine learning algorithm. The machine learning algorithm may be trained and updated using the historical state information and be utilized to predict equipment failure. For example, the machine learning algorithm may be configured to identify machine equipment failure thresholds (thresholds) which may be compared to aggregated data for a particular machine controller 724 and component 746 for determining a probability of failure. In situations where equipment failure is likely to occur (e.g., the state information exceeds or falls below a certain equipment failure threshold), the service provider computers 710 and machine data interface module 744 may be configured to generate a notification identifying the machine controller 724 and component 746 likely to fail, as well as generate a stop or wait command for updating the data structure of the likely to fail component 746. In embodiments, the service provider computers 710 and machine data interface module 744 may be configured to generate graphical representations of the requested or obtained state information from components 746 as well as generating and transmitting user interfaces using the graphical representations to user device 704 via networks 708.

Figure 8:
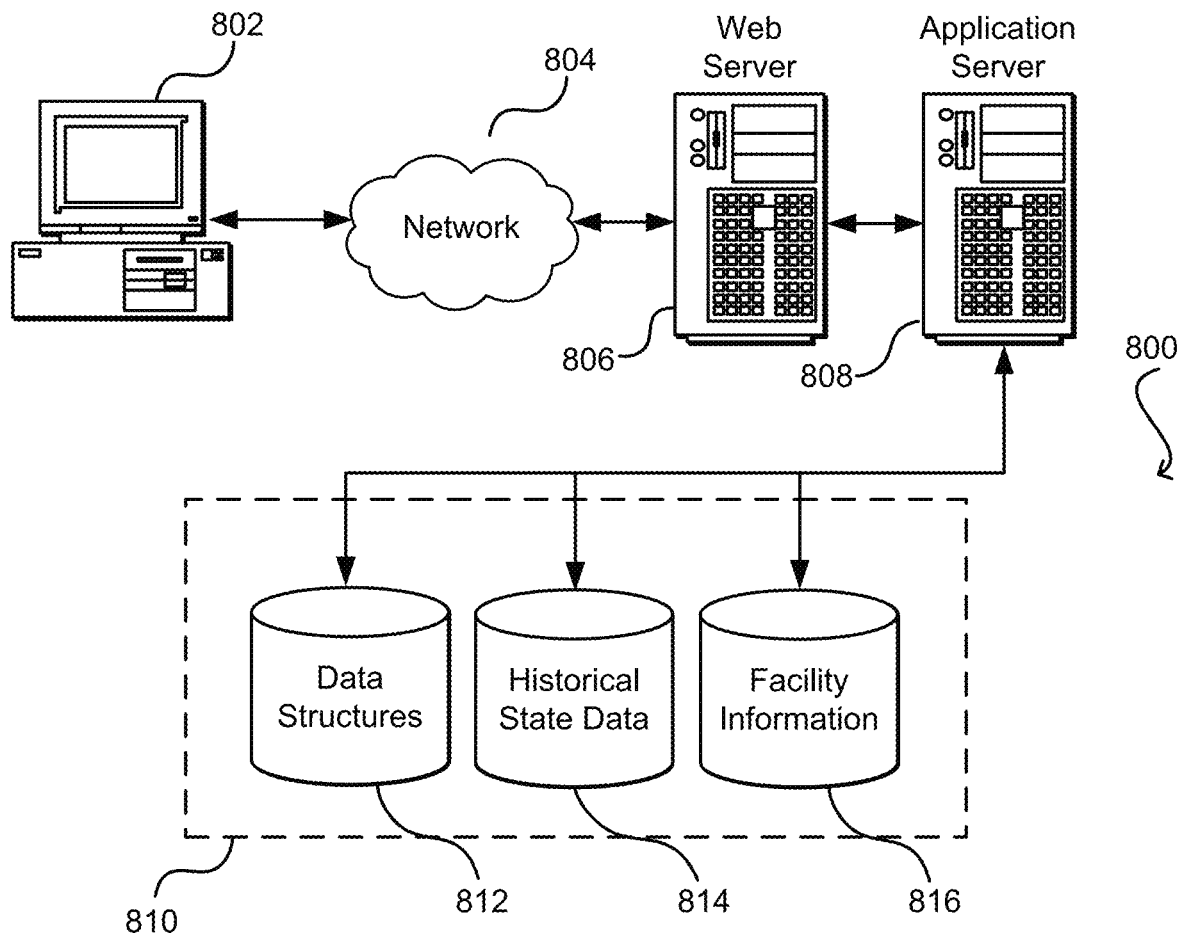
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device 802. Examples of such client devices include personal computers, cell phones, handheld messaging devices, laptop computers, set-top boxes, personal data assistants, electronic book readers, and the like. The network 804 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network 804 can be enabled by wired or wireless connections and combinations thereof. In this example, the network 804 includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data stores, data storage devices, and data storage media, in any standard, distributed, or clustered environment. A data store may include a database or other data object container for storing objects in a cloud environment that can be accessed via a network such as network 804. The application server 808 can include any appropriate hardware and software for integrating with the data store as needed to execute aspects of one or more applications for the client device 802, handling a majority of the data access and business logic for an application. The application server 808 provides access control services in cooperation with the data store 810 and is able to generate content such as text, graphics, audio, and/or video to be transferred to the user via client device 802, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server 806. It should be understood that the Web and application servers (806 and 808) are not required and are merely example components, as structured code discussed herein can be executed on any appropriate device or host machine as discussed elsewhere herein.

The data store 810 can include several separate data tables, data stores, databases or other data storage mechanisms and media for storing data relating to a particular aspect. For example, the data store 810 illustrated includes mechanisms for storing data structures 812 and facility information 816, which can be used to serve content for the production side as well as generate requests or otherwise poll controller systems and components of the controller systems for states of the components via data structures of the controller systems and components. The data store 810 also is shown to include a mechanism for storing historical state data 814, which can be used for reporting, analysis, or other such purposes such as training machine learning algorithms to predict failures of equipment such as components or the machine controller systems themselves. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system and from a user device, a request for information about a state of a component of a controller system of a facility, the request formatted in an agnostic data format and including identifiers for the component and the controller system;
   determining, by the computer system, a particular controller system of a plurality of controller systems of the facility and a particular component of a plurality of components of the particular controller system that correspond to the controller system and the component based at least in part on the agnostic data format, the particular controller system and the particular component each having unique identifiers different from the identifiers included in the request;
   determining, by the computer system, a data structure of the agnostic data format for the particular controller system and the particular component, the data structure associated with the state;
   requesting, by the computer system, the state from the particular controller system for the particular component using a format of the data structure, the particular controller system configured to translate the request of the state to a machine specific query associated with an integrated development environment (IDE) for the particular component according to the data structure;
   receiving, by the computer system and from the particular controller system, the state of the particular component according to the format of the data structure;
   generating, by the computer system, a graphical user interface that presents a graphical representation of the state of the component that corresponds to the state of the particular component by converting the state of the particular component according to the format of the data structure to the agnostic data format; and
   transmitting, by the computer system and to the user device, the graphical user interface.

2. The computer-implemented method of claim 1, wherein determining the particular component of the plurality of components is based at least in part on accessing an array data structure that maintains a number of the plurality of components associated with the particular controller system.

3. The computer-implemented method of claim 1, wherein determining the particular controller system of the facility is based at least in part on identifying a header of the data structure associated with the particular controller system.

4. The computer-implemented method of claim 1, wherein the information and the state of the component is based at least in part on a protocol associated with the particular component.

5. The computer-implemented method of claim 1, wherein the request and the state of the particular component are encrypted by the computer system.

6. The computer-implemented method of claim 1, wherein the request corresponds to a command for the component and the controller system, and wherein the state of the particular component includes an update to the data structure for the particular component that corresponds to executing the command of the request.

7. A non-transitory computer-readable storage medium storing computer-executable instructions that, when executed by a computer system, configure the computer system to perform operations comprising:
   receiving, from a user device, a request for information about a state of a component of a machine, the request formatted in an agnostic data format and including identifiers for the component and the machine;
   determining a particular machine and a particular component that corresponds to the machine and the component based at least in part on the agnostic data format, the particular component and the particular machine having unique identifiers different from the identifiers included in the request;
   determining a data structure of the agnostic data format for the particular machine and the particular component, the data structure associated with the state;
   requesting, by the computer system, the state from the particular machine for the particular component using a format of the data structure, the particular machine configured to translate the request of the state to a machine specific query for the particular component according to the data structure;

receiving, by the computer system and from the particular machine, the state of the particular component according to the format of the data structure; and converting, by the computer system, the state of the particular component according to the format of the data structure to the agnostic data format of the request.

8. The non-transitory computer-readable storage medium of claim 7, wherein the operations further comprise:
generating a graphical representation of the state of the particular format using the agnostic data format; and
transmitting, to the user device, the graphical representation.

9. The non-transitory computer-readable storage medium of claim 7, wherein the operations further comprise obtaining states for a plurality of data structures for a plurality of machines and associated components.

10. The non-transitory computer-readable storage medium of claim 9, wherein the operations further comprise training a machine learning model using the states for the plurality of data structures.

11. The non-transitory computer-readable storage medium of claim 10, wherein the operations further comprise determining a probability of an individual component of an individual machine ceasing to work, the individual component and the individual machine of the plurality of machines and the associated components.

12. The non-transitory computer-readable storage medium of claim 11, wherein the operations further comprise generating a notification identifying the individual component in response to the probability surpassing a threshold probability for the individual component.

13. The non-transitory computer-readable storage medium of claim 12, wherein the operations further comprise generating instructions to modify a stop state for the data structure of the individual component in response to generating the notification.

14. A computer system comprising:
a memory configured to store computer-executable instructions;
a processor in communication with the memory and configured to execute the computer-executable instructions to at least:
determine a particular machine and a particular component that corresponds to a machine and a component of a facility based at least in part on an agnostic data format of a polling request;
determine a data structure of the agnostic data format for the particular machine and the particular component, the data structure associated with a state;
request the state from the particular machine for the particular component using a format of the data structure, the particular machine configured to translate the request of the state to a machine specific query for the particular component according to the data structure;
receive, from the particular machine, the state of the particular component according to the format of the data structure; and
convert the state of the particular component according to the format of the data structure to the agnostic data format of the request.

15. The computer system of claim 14, wherein the processor in communication with the memory is further configured to execute the computer-executable instructions to at least:
generate a graphical representation of the state of the particular format using the agnostic data format; and
transmit, to a user device, the graphical representation.

16. The computer system of claim 14, wherein translating the request of the state to the machine specific query for the particular component according to the data structure includes using a communication protocol associated with the particular machine.

17. The computer system of claim 14, wherein the processor in communication with the memory is further configured to execute the computer-executable instructions to at least maintain a mapping between the agnostic data format and data structures for a plurality of machines and components of the machines, the machine of the plurality of machines and the component of the components.

18. The computer system of claim 17, wherein the processor in communication with the memory is further configured to execute the computer-executable instructions to at least update the mapping between the agnostic data format and the data structures based at least in part on a new definition for a portion of the data structures.

19. The computer system of claim 14, wherein the state from the particular machine is periodically transmitted, by the particular machine, to the computer system.

20. The computer system of claim 14, wherein the processor in communication with the memory is further configured to execute the computer-executable instructions to at least:
generate, in response to failing to determine the data structure for the particular machine, a notification indicating that the request could not be executed; and
transmit, to a user device, the notification.

* * * * *